United States Patent
Perkel et al.

(12) 
(10) Patent No.: US 6,513,075 B1
(45) Date of Patent: Jan. 28, 2003

(54) METHOD FOR PRESERVING DATA THROUGH A PROCESSOR SOFTBOOT

(75) Inventors: Daniel Perkel, Cambridge, MA (US); Roy Knight, Pelham, NH (US)

(73) Assignee: Oak Technology, Sunnyvale, CA (US)

( * ) Notice: Subject to any disclaimer, the term of this patent is extended or adjusted under 35 U.S.C. 154(b) by 0 days.

(21) Appl. No.: 09/382,225

(22) Filed: Aug. 24, 1999

(51) Int. Cl.[7] ........................ G06F 13/00; G06F 13/014; G06F 13/38
(52) U.S. Cl. ................. 710/8; 710/10; 713/1; 713/2; 713/100
(58) Field of Search ............. 710/8, 10; 713/2, 713/1, 100; 395/704, 701

(56) References Cited

U.S. PATENT DOCUMENTS 5,329,581 A  *  7/1994  Friedes et al. ............... 379/92
5,805,578 A  *  9/1998  Stirpe et al. ................ 370/255
6,003,130 A  * 12/1999  Anderson ...................... 713/2
6,205,558 B1 *  3/2001  Sobel ........................... 714/15
6,223,287 B1 *  4/2001  Douglas et al. ............ 713/178

* cited by examiner

Primary Examiner—Jeffrey Gaffin
Assistant Examiner—Rehana Perveen
(74) Attorney, Agent, or Firm—Testa, Hurwitz & Thibeault, LLP

(57) ABSTRACT

A method for preserving data through a softboot process is presented. Areas in a device DRAM are reserved for data structures generated during execution of a boot code stored in the device ROM. A communications channel between the device and an external device is established and data structures related to the communications channel status and startup diagnostics are written to reserved areas of DRAM. Firmware stored on an external device is downloaded to a different area of DRAM. After a softboot, the data structures in DRAM are accessed by firmware enabling the communications channel to be maintained and startup diagnostics data to be utilized.

12 Claims, 3 Drawing Sheets

METHOD FOR PRESERVING DATA THROUGH A PROCESSOR SOFTBOOT

FIELD OF THE INVENTION

The invention relates generally to a method for preserving data through a boot process. In particular, the invention relates to a method for preserving data generated by a startup program for access by a run-time program after a softboot process.

BACKGROUND OF THE INVENTION

In some applications, processors are used to execute different programs resident in different memory units. For example, a processor can be used to execute a startup program in read-only memory (ROM) and then execute a run-time program downloaded from an external device. This requires establishing a communications channel between the processor and the external device during execution of the startup program prior to downloading the run-time program from the external device.

Typically, the program in ROM closes the communication channel before transferring control to the downloaded run-time program. As a result, the state of the communication channel is cleared and the downloaded application establishes a new communications channel, unfortunately, opening the new communications channel adds more time to the extended time required to download the run-time program. Thus, it would be advantageous to preserve the communications channel while executing the startup program and then access it during execution of the run-time program.

SUMMARY OF THE INVENTION

The invention relates to a method for preserving data through a softboot process. A first program (e.g., a boot program in ROM) opens a communication channel between a processor and an external module. Pointers identify reserved areas in dynamic random-access memory (DRAM) where data to be passed to a run-time program, such as communication state variables and self-test data, are written. The run-time program is downloaded to a different area in DRAM so that the data to be passed is preserved and can be retrieved during execution of the run-time program.

In one aspect, the method includes the steps of executing a startup program in a processor, establishing a communications channel between the processor and an external module, and storing a data set in a first predetermined area of a local memory module. In one embodiment, the communications channel is established between the processor and a memory module in the external module. The method includes the additional steps of downloading a run-time program from the external module into a second predetermined area of the local memory module and executing the run-time program in the processor, including accessing the communications channel data set.

In one embodiment, the method includes the step of storing self-test data in the local memory module. In another embodiment, the self-test data is stored in a third predetermined area of the local memory module.

In one embodiment, the method includes the step of verifying proper downloading of the run-time program. In another embodiment, the step of verifying proper downloading includes examining a checksum in the run-time program.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DESCRIPTION OF THE INVENTION

Figure 1:
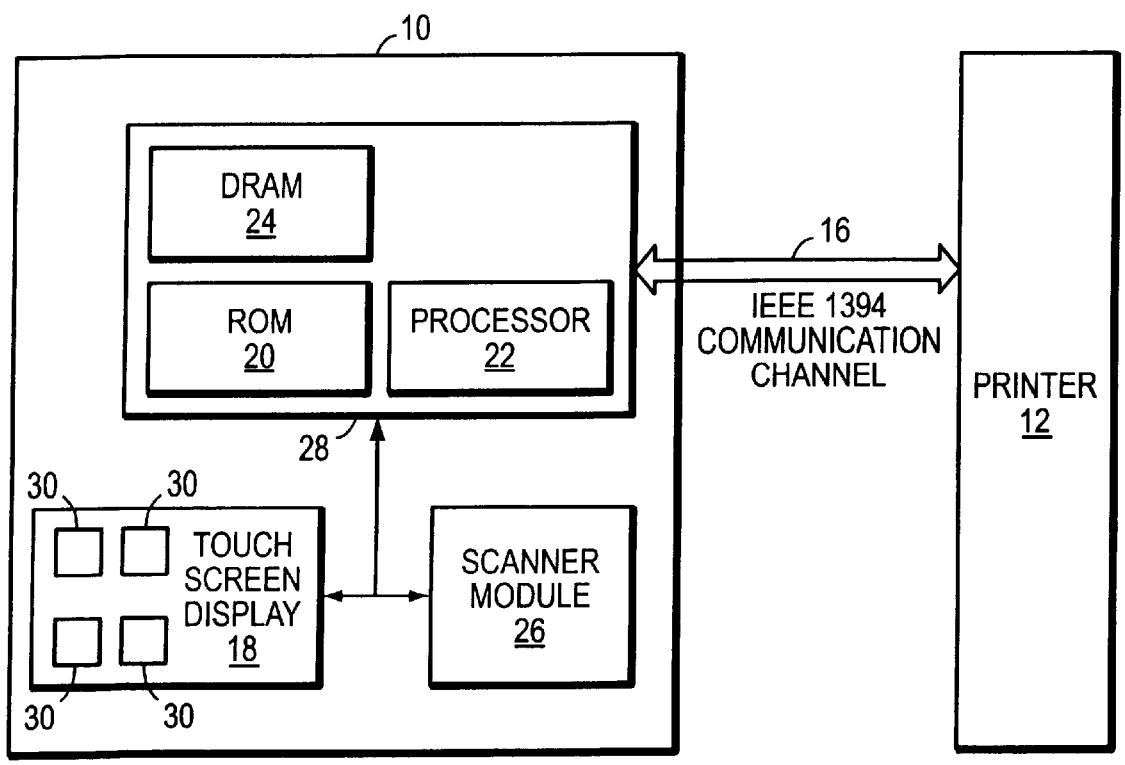
FIG. 1 is a block diagram of a scanner and high speed printer system.

Referring to FIG. 1, a scanner system 10 is configured with a high speed printer 12 to obtain high speed, high quality photocopies. The scanner system 10 includes an interface module 14 which communicates with a scanner module 26 through a command port 28. The scanner system 10 communicates with the high speed printer 12 through a high performance serial bus 16 in compliance with the IEEE 1394 standard. A touch screen user interface 18 in the scanner 10 is used to control copying operations. The user selects the image settings using keypads 30 generated on the touch screen 18. The interface module 14 translates the user keypad selections into appropriate commands for the scanner 10 and printer 12. The interface module 14 updates the touch screen display 18 with status messages and screen icons as required.

A Motorola model M68306 microprocessor 22 in the interface module 14 is booted from a startup program stored in a ROM 20. The startup program sets up the microprocessor 22 to interact with other modules in the interface module 14, executes boot diagnostics, polls for a printer, connects to the printer 12, initiates a download of run-time program (e.g., firmware) from the printer 12 to DRAM 24, and transfers execution to the downloaded code. Once the display subsystem is successfully tested, the interface module 14 informs the user of the startup status by an appropriate icon on the touch screen display 18.

Figure 2:
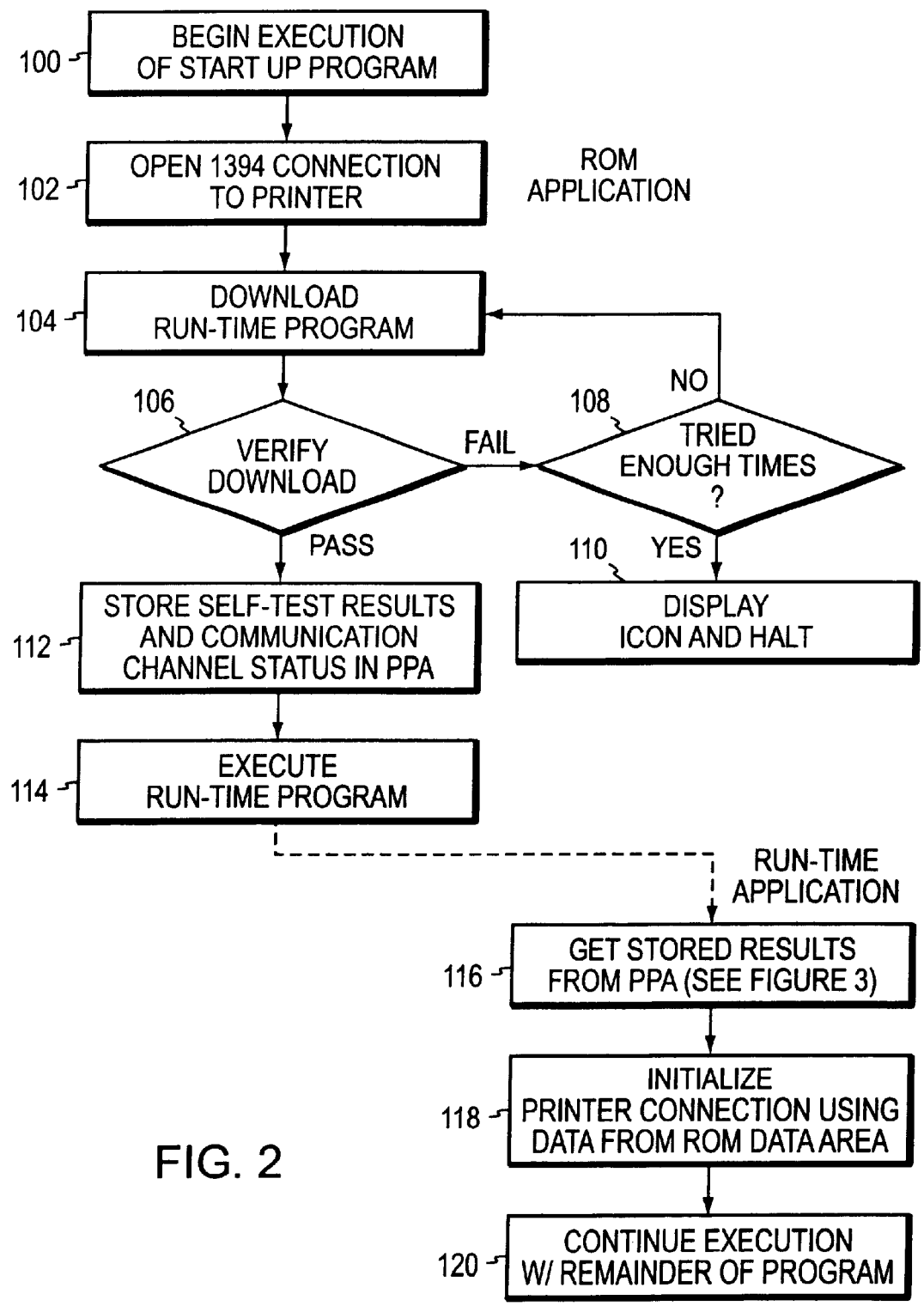
FIG. 2 is a flowchart showing establishment of a communications channel and transfer of processor control for the scanner and high speed printer system of FIG. 1.
Figure 3:
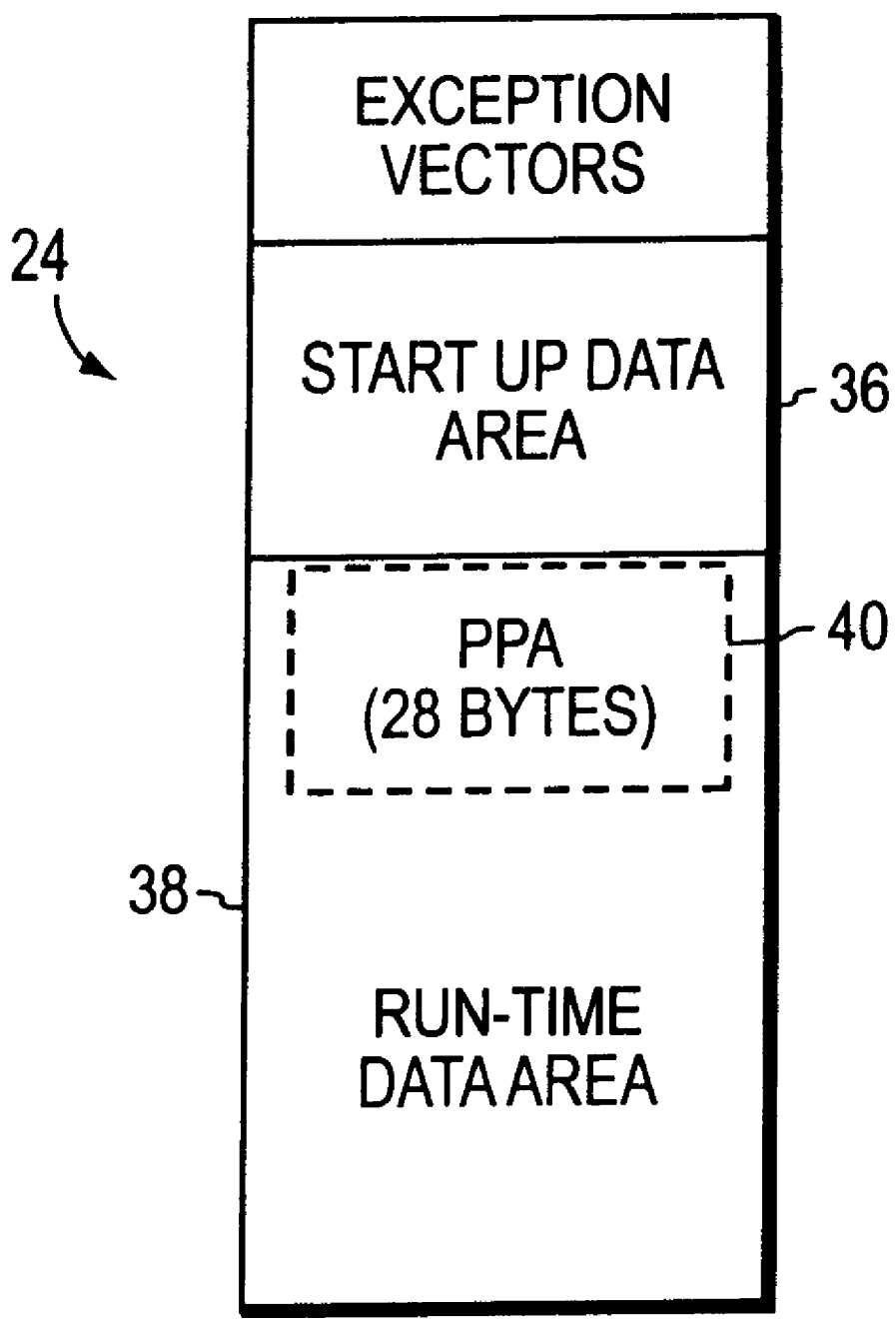
FIG. 3 is a block diagram illustrating DRAM memory organization according to the present invention.

Referring to FIGS. 2 and 3, execution of a startup program begins in step 100. The startup program includes a series of self tests. If self-testing fails, an appropriate message or icon is displayed on the touch screen display 18. In step 102, an IEEE 1394 communications channel to the printer 12 is established. The state parameters of the communication channel are stored in the startup data area 36 in DRAM 24. A run-time program on the printer hard disk is downloaded into the run-time data area 38 of DRAM 24 in step 104. The run-time program is downloaded regardless of the results of the startup program self-testing because the run-time program includes the software to report errors in a customized fashion (e.g., local language display).

Verification of the downloaded program is performed in step 106. The verification uses a checksum algorithm to determine that the downloaded program was received without errors. If the checksum indicates that error are present, the number of download attempts is examined in step 108. If the number of download attempts does not exceed a predetermined maximum, another download is attempted. If, however, the number of download attempts exceeds the predetermined maximum, an icon is displayed on the touch screen display 18 and execution of the startup program is halted in step 110.

If the checksum indicates that there are no download errors, the startup program modifies certain values in the program parameter area (PPA) 40 in step 112. The run-time program has no a priori knowledge of the structure of the startup data area 36 in DRAM 24. In one example, the PPA 40 is a static data area set up to include the first seven words (28 bytes) of the run-time data area 38 in DRAM 24. Each of the seven words has a predefined meaning. The modified values include a communications channel data pointer and self-test results.

Control is transferred from the startup program to the run-time program via a softboot process (i.e., a soft reset) in step 114. In step 116, the communications device driver obtains the communications channel data pointer from the PPA 40 and uses the corresponding data to initialize the printer 12 in step 118. Execution of the run-time program continues in step 120.

The startup and run-time programs both use the same IEEE 1394 communication device driver. Placing a pointer to the communication channel data in the PPA 40 provides the run-time driver with everything necessary to preserve the open communication channel because the two communication drivers use similar data structures. The pointer is used to access the communications channel data regardless of its size or location within the startup data area 36.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for preserving data through a processor softboot, comprising the steps of:

executing a startup program in a processor;

establishing a communications channel between the processor and an external module;

storing a communications channel data set in a first predetermined area of a local memory module;

downloading a run-time program from the external module into a second predetermined area of the local memory module; and executing the run-time program in the processor, including accessing the communications channel data set written into the first predetermined area of the local memory module to thereby preserve the entire communications channel for use by the run-time program.

2. The method of claim 1 wherein the step of establishing a communications channel comprises establishing a communications channel between the processor and a memory module in the external module.

3. The method of claim 1 further comprising the step of storing a data set comprising self-test data in the local memory module.

4. The method of claim 1 further comprising the step of verifying proper downloading of the run-time program in the local memory module.

5. The method of claim 4 wherein the step of verifying proper downloading comprises examining a checksum in the run-time program.

6. The method of claim 1 wherein the step of downloading comprises transferring the run-time program in blocks of a predetermined size.

7. The method of claim 1 wherein the execution of the run-time program is responsive to the communications channel data set.

8. The method of claim 3 wherein the data set comprising self-test data is stored in a third predetermined area of the local memory module.

9. A method for preserving data through a processor softboot, comprising the steps of:

executing a first program in a processor;

establishing a communications channel between the processor and an external module;

storing a data set in a first predetermined area of a first memory module;

downloading a second program from the external module into a second predetermined area of the first memory module; and providing the second program with the address of the data set in the first predetermined area of the first memory module to thereby preserve the entire communications channel for use by the second program.

10. The method of claim 9 further comprising the step of executing the second program on the processor.

11. The method of claim 10 further comprising the step of accessing the data set in the first memory module.

12. A method for preserving data through a processor softboot, comprising the steps of:

executing a startup program in a processor;

establishing a communications channel between the processor and an external memory module;

storing a communications data set in a first predetermined area of a local memory module;

storing a self-test data set in a second predetermined area of a local memory module;

downloading a run-time program from the external memory module into a third predetermined area of the local memory module; and executing the run-time program in the processor, including accessing the data sets written into the first and second predetermined areas of the local memory module.

* * * * *